United States Patent [19]

Taoda

[11] Patent Number: 5,707,915
[45] Date of Patent: Jan. 13, 1998

[54] PHOTOCATALYST SHEET AND METHOD FOR PRODUCING THEREOF

[75] Inventor: Hiroshi Taoda, Aichi, Japan

[73] Assignee: Japan as represented by Director General of Agency of Industrial Science and Technology, Tokyo, Japan

[21] Appl. No.: 732,122

[22] Filed: Oct. 15, 1996

[30] Foreign Application Priority Data

Oct. 16, 1995 [JP] Japan ................... 7-293597

[51] Int. Cl.$^6$ .................. B01J 31/02; B01J 21/06
[52] U.S. Cl. .................. 502/159; 502/349; 502/350
[58] Field of Search .................. 502/349, 350, 502/159

[56] References Cited

U.S. PATENT DOCUMENTS

| | | | |
|---|---|---|---|
| 5,403,513 | 4/1995 | Sato et al. ................... | 252/309 |
| 5,501,801 | 3/1996 | Zhang et al. ................ | 210/748 |
| 5,547,823 | 8/1996 | Murasawa et al. .......... | 430/531 |

FOREIGN PATENT DOCUMENTS

| | | | |
|---|---|---|---|
| 405096181 | 4/1993 | Japan .................... | 502/350 |

OTHER PUBLICATIONS

Journal of Catalysis, vol. 82, pp. 404–417, Feb. 4, 1983, Ann Lorette Pruden, et al., "Photoassisted Heterogeneous Catalysis: The Degradation of Trichloroethylene in Water".

Chemosphere, vol. 25, No. 11, pp. 1589–1597, 1992, Hisao Hidaka, et al., "Photocatalytic Degradation of the Hydrophobic Pesticide Permethrin in Fluoro Surfactant/$TiO_2$ Aqueous Dispersions"—Jul. 1992.

Industrial Water, vol. 379, pp. 11–14, 1990, Teruaki Hisanaga, et al. —no month.

*Primary Examiner*—Glenn Caldarola
*Assistant Examiner*—Nadine Preisch
*Attorney, Agent, or Firm*—Oblon, Spivak, McClelland, Maier & Neustadt, P.C.

[57] ABSTRACT

A photocatalyst sheet capable of purifying the living environment by decomposing and removing malodorous substances and environment-polluting substances in the air, preventing development of bacterium, fungi, and protecting contamination, and a method for production thereof which comprises coating a solution of a titania sol on the surface of a sheet of organic substance such as plastic, and heating it under pressure to deposit the titanium powder on the surface of the sheet.

7 Claims, No Drawings

PHOTOCATALYST SHEET AND METHOD FOR PRODUCING THEREOF

DESCRIPTION OF THE INVENTION

This invention relates to a photocatalyst sheet useful for materials purifying the living environment, being able to decompose and remove malodorous substances, harmful substances in the air, and prevent developing of bacterium and fungi, and a method for the production thereof.

BACKGROUND OF THE INVENTION

The living environment is polluted by substances such as substances having offensive odors, fungi, bacterium or numerous chemical substances. For example, numerous substances such as a insecticide for flies, mosquitoes and white ants, nitrogen oxides and benzpyrene of carcinogenic substances developed in combustion of oil in oil-stove, formaldehyde released from building materials, smoke of tobacco, fungi and bacterium come from pets, which are scattered about, are becoming a serious problem causing allergic disease such as asthma and atopy.

At this time, in a case of treatment of substances polluting the living environment such as offensive odors, bacterium, fungi and soiled things, generally, chemicals such as aromatic agent and detergent are used, however it was observed that odors derived from the aromatic agent transfered to foods and the like and therefore the living environment was polluted by the chemicals itself.

A photocatalyst of titanium oxide is able to decompose safety and easily various organic substances being difficult to be decomposed, by irradiating with light without using harmful chemicals.

When a titanium oxide is irradiated with light, it generates electrons having a strong reducing activity and positive holes having a strong oxidizing activity and causes molecules which come into contact with the titanium dioxide to be decomposed by the oxidizing-reducing activity. By harnessing this photocatalytic activity of the titanium oxide, organic solvents dissolved in water, such substances as agricultural pesticides and surfactants which pollute the environment, and noxious substances in the air, and soiled things can be removed by decomposition, and developing of bacterium and fungi are prevented. This method utilizes exclusively a titanium oxide and light. It has an advantage over biotic treatment methods using microorganisms in that it is less restricted by such reaction conditions as temperature, pH, gaseous atmosphere, and toxicity. Moreover, it enables organic halogen compounds and organic phosphorus compounds, which are not easily treated by biotic methods, to be easily decomposed and removed.

The studies performed to date regarding the removal of organic substances by photocatalytic decomposition have used photocatalysts in the form of powder [as reported in A. L. Pruden and D. F. Ollis, Journal of catalysis, Vol. 82, 404 (1983), H. Hidaka, H. Jou, K. Nohara, J. Zhao, Chemosphere, Vol. 25, 1589 (1992), Teruaki Hisanaga, Kenji Harada, and Keiichi Tanaka, Industrial Water, Vol. 379, 11 (1990), for example]. These photocatalysts are difficult to handle or use and therefore it was difficult to make it for practical use. Further, since, in the case of kneading a titanium oxide powder into a plastic, the greater part of the titanium oxide powder was buried under the plastic, and thus obtained sheet showed a low activity as a catalyst and the plastic used as a basic material came to being decomposed and deteriorated easily, it was difficult to prepare a photocatalyst sheet to be handled or used for practical use.

SUMMARY OF THE INVENTION

This invention provides a photocatalyst sheet capable of purifying the living environment by decomposing and removing malodorous substances and environment-polluting substances in the air, preventing development of bacterium, fungi, and protecting contamination, and a method for producing thereof. The photocatalyst sheet of the present invention is prepared by a simplified method which comprises coating a solution of a titania sol on the surface of a sheet of organic substance such as plastic, and heating it under pressure to deposit the titanium powder on the surface of the sheet. The photocatalyst sheet is characterized by, as a result of the oxidizing-reducing activity of electrons and positive holes formed when the photocatalyst sheet is irradiated with light, being able to quickly decompose and remove various organic compounds and soiled things including malodorous substances, harmful substances in the air, environment-polluting organic solvents and agricultural pesticides dissolved in water, and prevent development of bacterium and fungi, and by being able to be used in low cost and energy, and safety, and able to maintain this effect on a maintenance-free basis.

DETAILED DESCRIPTION OF THE INVENTION

The object of the present invention is to provides a photocatalyst sheet being able to inexpensively decompose and remove malodorous substances and environment-polluting substances in the air, and prevent developing of bacterium and fungi, and protect from contamination to purify the living environment, and a method for the production thereof.

The present inventors continued a study with a view to meet these object, and it has been found that a photocatalyst sheet, which is prepared by coating a sheet of organic substances such as plastic and the like with a solution of titania sol, and heating it under pressure to deposit a titanium oxide powder on the sheet, by the oxidizing-reducing activity of electrons and positive holes formed when the titanium oxide is irradiated with light, is able to quickly decompose and remove various organic compounds including malodorous substances, harmful substances in the air, environment-polluting organic solvents and agricultural pesticides dissolved in water, and is able to maintain this effect on a maintenance-free basis, and has accomplished this invention as a result.

This invention relates to a photocatalyst sheet which comprises a sheet of organic substances coated with a titanium oxide powder, and a method for the production of the photocatalytic sheet which comprises of coating the sheet of organic substances with a solution of titania sol, and heating it under pressure to deposit the titanium oxide powder on the surface of the sheet.

As a sheet of organic substance used in the present invention, a sheet made of various plastic or polymer of the same such as polyethylene, nylon, polyvinyl chloride, polyvinylidine chloride, polyester, polypropylene, polyethylen oxide, polyethylene glycol, polyethylene terephthalate, silicone resin, polyvinyl alcohol, vinylacetal resin, polyacetate, ABS resin, epoxy resin, acetovinyl resin, cellulose, cellulose derivative, polyamido, polyurethane, polycarbonate, polystyrene, urea resin, fluoro resin, polyfluorovinylidene, phenol resin, celluloid, chitin, or starch and the like.

As a solution of titania sol used in the present invention, a solution prepared by hydrolyzing titanium alkoxide or titanium salt, preferably a suspension or a slurry prepared by suspending a ultrafine titanium oxide powder in water or organic solvent are used. As solvents usable for preparing the solution of titania sol, there can be mentioned such solvents as water, alcohol, ester, ether, amine, hydrocarbon, a mixture thereof, or a mixture of water and hydrochloric acid, or nitric acid, and a solvent having an affinity and wetting property with a sheet of organic substances to be coated with a solution of titania sol. In order to increase tightness with sheet, it is preferable to add a silane coupling reagent or titanium coupling reagent to a solution of titania sol. It can be possible to add a surfactant to the solvent to enable to disperse an ultrafine titanium powder in it. As a titanium oxide, a titanium oxide possessing an anatase as a form of crystal is preferable.

The photocatalyst sheet of the present invention is prepared by coating a sheet of organic substances with thus obtained solution of titania sol, and heating it under pressure to deposit the titanium oxide powder on the surface of the sheet. In the case of coating the sheet of organic substances with a solution of titania sol, it is needed to clean the surface of the sheet or organic substances to remove adhered substances such as oil, and to coat the surface with a solution of titanium sol uniformly. The heating temperature is preferably near by the temperature of softening point or melting point of the sheet of organic substances. In the heating of them, it is not necessarily needed to perform it under pressure, however, it is preferable to heat them under pressure condition to deposit a titanium oxide powder on the surface of the sheet tightly. In this case, it is preferable to pressure them uniformly by using a pressure of roll press, pressure of the air and the like.

Since the photocatalyst sheet prepared by the present invention has a titanium oxide presented only on the surface of the sheet, it enables to be exposed to sunlight or artificial light from a fluorescent lamp, an incandescent lamp, a black light, a UV lamp, a mercury lamp, a xenon lamp, a halogen lamp or metal halide lamp, and by the oxidizing-reducing activity of the electrons and positive holes, it quickly and continuously decomposes and removes various organic compounds including malodorous substances, harmful substances in the air, environment-polluting substances, and prevents developing bacterium and fungi, and protects contamination to purify the living environment with high efficiently.

Since a sheet of organic substances is coated with a titanium oxide powder uniformly, the sheet is not deteriorated easily, and is able to maintain its effect surely. Since this photocatalyst of the present invention simply requires exposure to light, it operates inexpensively, consumes little energy, and does not require maintenance.

EXAMPLES

The present invention will now be described specifically with reference to working examples using water and organic solvent as solvents for a solution of titania sol.

Example 1

A solution of a titania sol was prepared by suspending 5 g of an ultrafine anatase of titanium oxide having 7 μm of particle diameter in 10 ml of water. A polyvinylalcohol film was coated with the solution and heated under pressure at 230° C. of softening point of the film to deposit the titanium oxide powder on the surface of the film. As a result, white photocatalyst sheet was obtained. This photocatalyst was used as a catalyst for decomposing and removing a malodorous substance. Using an injector, 80 ppm of trimethylamine was introduced into the container as a malodorous substance in the rate of 10 ml/min, irradiating the photocatalyst with the light from a 500-W xenon lamp, and then the resultant reaction solution was analyzed by gas chromatography to determine the amount of trimethylamine contained therein. The trimetylamine concentration in the solution was found to have been decreased by 15 ppm. In a comparative experiment carried out by repeating the same procedure while omitting the use of the photocatalyst sheet and using ordinary sheet, the amount of trimethylamine contained in the reaction solution showed virtually no decrease. These results clearly indicates that the photocatalyst sheet of titanium oxide functions as a catalyst for the decomposition of trimethlyamine. Further, as a result by examining the function of the photocatalyst sheet, it was found that the photocatalyst sheet had functions preventing development of bacterium and fungi, decomposing soiled thins, preventing infection from MRSA and the like.

Example 2

A solution of a titania sol was proposed by suspending 4 g of an ultrafine anatase of titanium oxide with 7 μm of particle diameter in 10 ml of propylene glycol. The solution was supplied on the surface of polyethylene film to coat it uniformly, and they were heated under pressure at 120° C. of melting point of the film to deposit the titanium oxide powder on the surface of the film. As a result, white photocatalyst sheet was obtained. As a result by examining the function of the photocatalyst sheet, it was found that the photocatalyst sheet had function decomposing and removing various substances such as malodorous substances, environment-polluting substances in the air, preventing development of bacterium and fungi, under the condition of irradiating the photocatalyst sheet with sunlight. Further, by examining functions of the photocatalyst sheet concerning functions preventing development of bacterium and fungi, decomposing soiled things and preventing infection from MRSA in the same method as used in Example 1, it was found to have excellent results as same as Example 1.

As mention above, the present invention is to provide a photocatalyst sheet being able to decompose and remove malodorous substances, environment-polluting substances in the air, and prevent developing bacterium and fungi, protecting contamination to purify the living environment inexpensively, and a method for the production thereof. A titanium oxide used in the present invention is used as materials for products such as paints, cosmetics, tooth powder, and has various merits such as being inexpensive excellent in durability, sturdy, harmless and safety. The photocatalyst sheet of the invention is prepared by a simplified method which comprises coating a sheet of organic substances such as a plastic and the like with a solution of titania sol, and healing it under pressure condition to deposit the titanium oxide powder on the surface of the sheet, and by the oxidizing-reducing activity of electrons and positive holes formed when the titanium oxide is irradiated with sunlight or artificial light, being able to quickly decompose and remove malodorous substances and smoke of tobacco, harmful substances such as $NO_x$, $SO_x$ in the air, and being able to prevent developing bacterium and fungi, infection of MRSA in hospitals, and protect contamination to purify the living environment efficiently. Further, it can be used to decompose and remove various organic compounds including environment-polluting organic solvents and agricultural pesticides dissolved in water. Since a photocatalyst sheet of the invention has a titanium oxide powder only on the surface of the sheet, the whole of the sheet can be exposed with the light irradiated, and the sheet is able to use the light efficiently, and decomposes and removes environment-polluting substances quickly and effectively by the function of photocatalytic activity. Since this photocatalyst simply requires exposure to lights such as sunlight and artificial light, and requires no harmful substances such as ozone and the like, it operates inexpensively, consumes little energy, and does not require maintenance, as compared with ordinary method using ozone. Further, since it is possible to fix the titanium oxide powder on the surface of a sheet of organic substances as a logo, a symbol mark and a design of flower, it can be used as a sheet having a excellent, fine sight, and a medium for advertisement.

The photocatalyst sheet of the invention is preferably used in various treatment such as treating a room of car, house and kitchen, toilet room, and purifying waste water, pool and water stored, and preventing developing bacterium and fungi, and preserving food from decay and the like. By using the photocatalyst sheet formed in a shape of a case, it can be performed to prevent developing bacterium and fungi, remove malodorous substances, and preserve foods from decay effectively.

What is claimed is:

1. A method for production of a photocatalyst sheet comprising coating one side of a sheet of an organic substance with a titania sol containing a titanium oxide powder, and heating the said sheet and applying pressure of one atmosphere or more to the said titanium oxide powder to deposit the titanium oxide powder on the surface of the sheet.

2. The method for production of the photocatalyst sheet according to claim 1, wherein the heating temperature is near the melting point of the sheet of the organic substance.

3. The method of production of the photocatalyst sheet according to claim 1, wherein the titania sol is prepared by suspending an ultrafine titanium oxide powder possessing a crystal form of anatase in water or an organic solvent to form a suspension or a slurry of the same.

4. The method of production of the photocatalyst sheet according to claim 1, wherein pressure is applied with a roll press.

5. The method of production of the photocatalyst sheet according to claim 1, wherein pressure is applied with air.

6. A photocatalyst sheet produced by the method according to claim 1, wherein the titanium oxide powder is deposited on one side of the sheet of the organic substance under applying pressure to the said titanium oxide powder.

7. A photocatalyst sheet according to claim 4, wherein the crystal form of the titanium oxide is anatase.

* * * * *